Jan. 10, 1939.  J. E. FOLTZ  2,143,239
CABINET
Filed Dec. 12, 1936   3 Sheets-Sheet 1
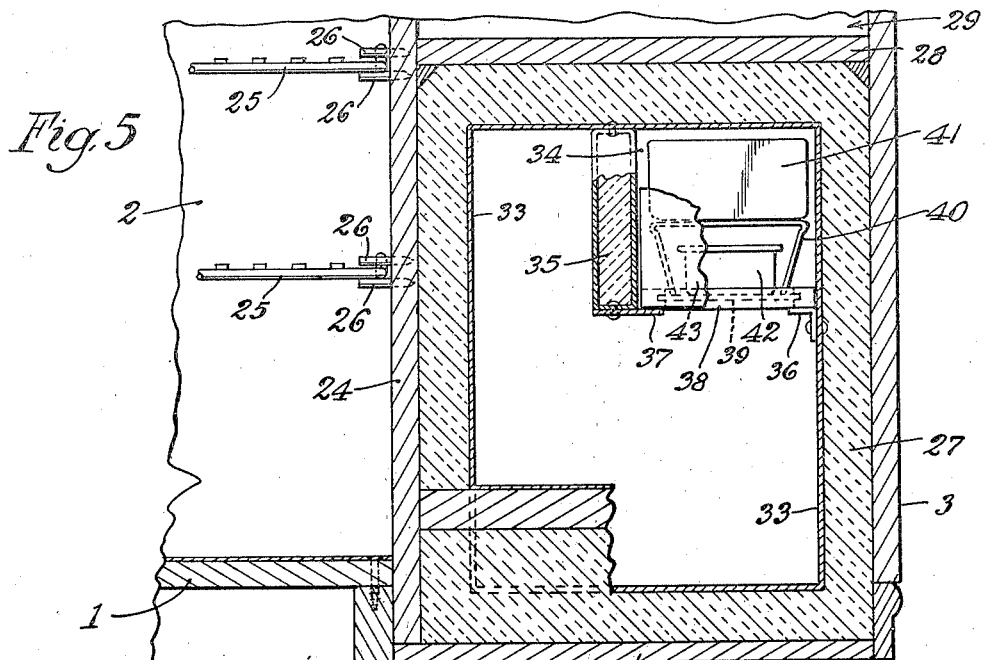
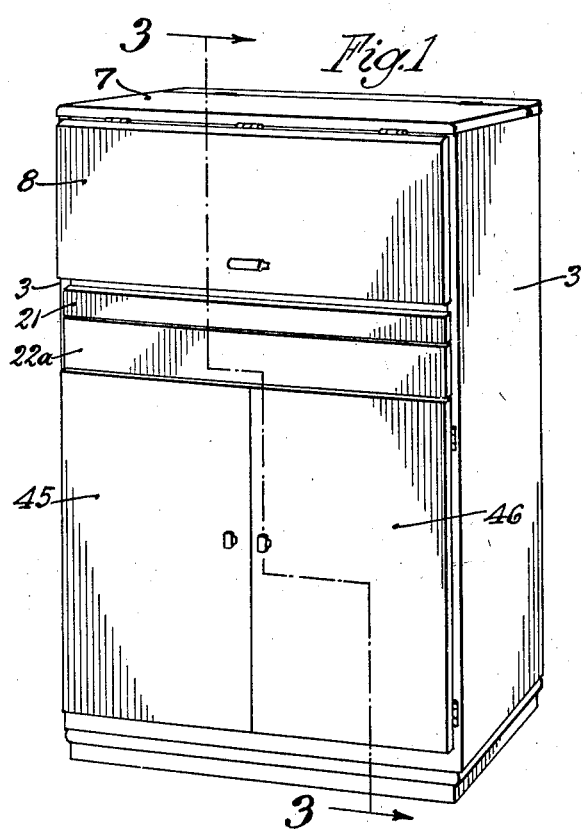
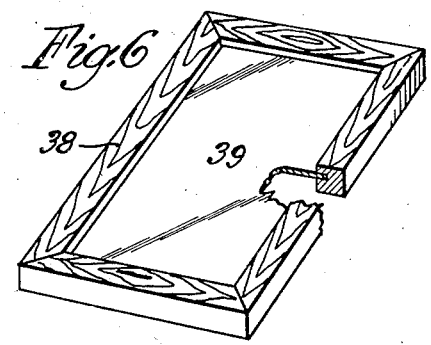
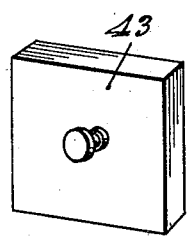
Inventor
Jefferson Ervin Foltz
by Parker & Carter
Attorneys.

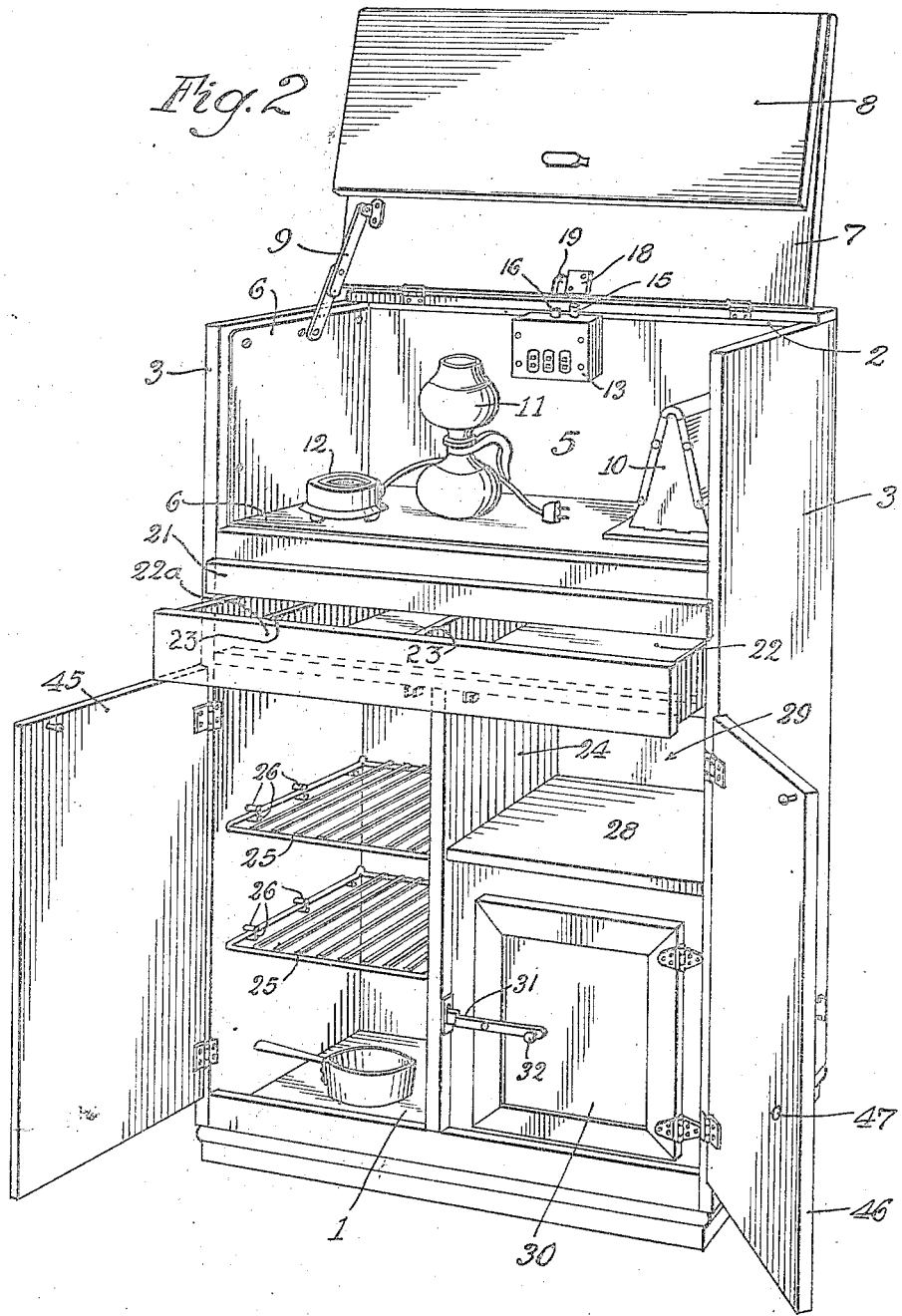

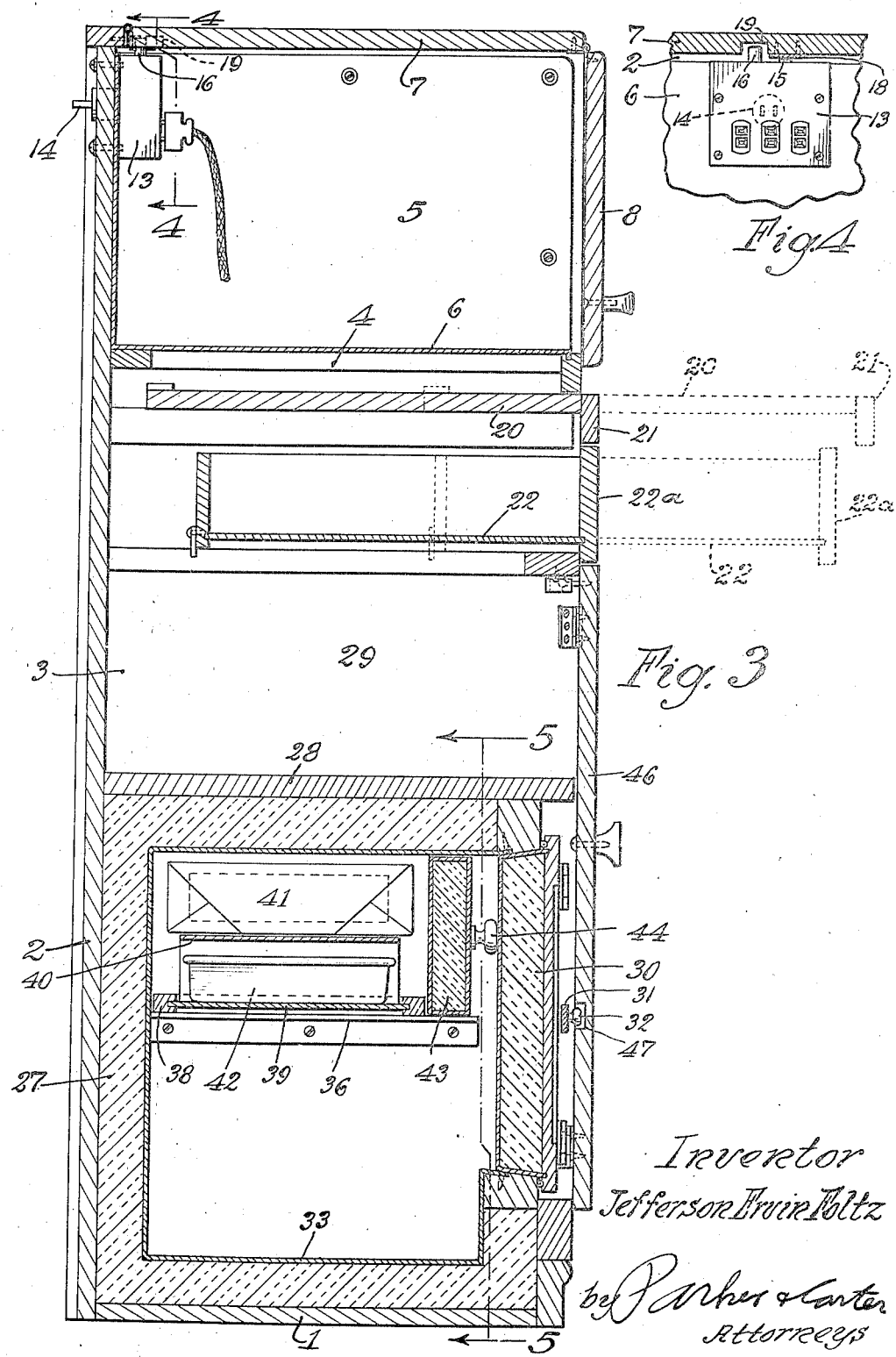

Patented Jan. 10, 1939

2,143,239

UNITED STATES PATENT OFFICE 2,143,239

CABINET

Jefferson Ervin Foltz, Winnetka, Ill., assignor to Coffee-et, Inc., Winnetka, Ill., a corporation of Illinois Application December 12, 1936, Serial No. 115,511

3 Claims. (Cl. 62—91.5)

My invention relates to improvements in cabinets and may be adapted to use as a kitchen or cooking cabinet, a portable bar or beverage dispensing cabinet, or for light housekeeping and hotel cooking.

One object is to provide in combination a cabinet which will have place for cooking and cooking utensils, place for the storage of food, glassware, and the like, and in combination therewith a cold chamber.

Other objects will appear from time to time in the specification.

My invention is illustrated more or less diagrammatically in the accompanying drawings, wherein:

Figure 1 is a perspective view of my cabinet in the closed position;

Figure 2 is a perspective view of the cabinet with all but the cold chamber in the open position;

Figure 3 is a section on a large scale along the line 3—3 of Figure 1;

Figure 4 is a detail section along the line 4—4 of Figure 3;

Figure 5 is a section along the line 5—5 of Figure 3;

Figure 6 is a perspective of the cooling plate forming part of the cold chamber;

Figure 7 is a perspective of the insulating cover for the dry ice compartment.

Like parts are indicated by like characters throughout the specification and drawings.

My cabinet includes a bottom 1, a back 2, and sides 3. It is divided into separate compartments by a horizontal partition 4, which partition forms the floor for the working compartment 5. This working compartment is open at the top and front and is preferably lined with an enamelled metal lining 6. This compartment is provided with a top cover 7 hinged to the top of the back wall 2 and a front 8 hinged to the top cover 7, being preferably supported in the open position by a releasable strut 9. This compartment is adapted to contain, for instance, a toaster 10, a coffee percolator 11 and a heating element 12 therefor. In this compartment is a terminal block 13 associated with a conductor 14 which may lead to any suitable source of electric power. A switch is contained within the block 13 having push buttons 15, 16, and the under side of the cover 7 is provided with a plate 18 adapted to engage the button 15 and automatically turn the switch off when the cover is closed, the cover being provided with a pocket 19 to permit the button 16 to come up when the button 15 goes down to the off position.

Below the partition 4 is a slidable bread or chopping board 20 flanged as at 21 in continuation of the front 8. Below this bread board is a drawer 22 having a front 22A in parallelism with the flange 21. This drawer is provided with a plurality of partitions 23 to divide it up into suitable compartments. Extending vertically from the bottom 1 up to the bottom of the drawer 22 is a partition 24. On one side of this partition are a plurality of open-work sliding trays 25 held on pins or other suitable brackets 26. On the opposed side of the partition is a built-in cold chamber comprising an insulated box 27. The top of this box 28 furnishes the floor for a food compartment 29. The insulated cold chamber has a hinged door 30 adapted to be held in closed position by a latch 31 having a handle 32. The cold chamber is lined with a metallic enamelled lining 33. In the upper portion of the cold chamber is an ice chamber 34 insulated as at 35 from the cold chamber. The bottom of this ice chamber is open and bounded by brackets 36, 37 upon which is slidably supported a wooden or insulating frame 38 containing a metallic plate 39. Resting on this metallic plate 39 is a U-shaped metallic frame 40 which is in direct metallic contact with the plate but out of contact with the lining for the cold chamber. This frame is adapted to support a block of dry ice 41 which is preferably wrapped in paper or some suitable insulation to check its rate of evaporation. Within the frame 40, resting on the plate 39, is an ice cube box 42. The ice compartment is closed by an insulating door 43 having a handle 44 so positioned that when the door 30 is in the closed position the handle 44 is engaged and held snugly in seated insulating position so that the cooling effect in the cold chamber comes exclusively from the metal plate in contact with the above mentioned supporting frame.

The cabinet is closed by doors 45, 46, the door 46 being apertured as at 47 to engage the handle 32 and thereby hold that handle against displacement so that as this portable cabinet is moved about with the doors closed, there is no possible chance that the cold cabinet door will open and will permit opening of the ice compartment as, if this happened, the ice would be wasted and the cold would be so intense that the articles in the ice compartment would be frozen too hard for use.

I claim:

1. In combination, a cold chamber, an ice compartment therein, bounded at the top, one side and the back by the walls of the cold chamber, an insulating wall depending from the top of the cold chamber to form the other side of the ice chamber, brackets supported on the insulating wall and the cold chamber wall at the bottom of the ice chamber, a metal plate having an insulating peripheral frame supported on said brackets and forming the bottom floor for the ice compartment, a pivoted closure for the cold chamber, a slidable closure for the open end of the ice compartment and a push member carried by such slidable closure and adapted to be engaged by the inner wall of the pivoted closure when it approaches its closed position to force the ice compartment closure inwardly against the bottom wall thereof.

2. In combination, a cold chamber, an ice compartment therein, bounded at the top, one side and the back by the walls of the cold chamber, an insulating wall depending from the top of the cold chamber to form the other side of the ice chamber, brackets supported on the insulating wall and the cold chamber wall at the bottom of the ice chamber, a metal plate having an insulating peripheral frame supported on said brackets and forming the bottom floor for the ice compartment, a pivoted closure for the cold chamber, a slidable closure for the open end of the ice compartment and a push member carried by such slidable closure and adapted to be engaged by the inner wall of the pivoted closure when it approaches its closed position to force the ice compartment closure inwardly against the bottom wall thereof, a conducting frame removably supported on the metal plate, positioned by the insulating frame within the ice compartment and adapted to support a supply of ice out of contact with any part of the walls of the ice compartment.

3. In combination, a cold chamber, an ice compartment therein, bounded at the top, one side and the back by the walls of the cold chamber, an insulating wall depending from the top of the cold chamber to form the other side of the ice chamber, brackets supported on the insulating wall and the cold chamber wall at the bottom of the ice chamber, a metal plate having an insulating peripheral frame supported on said brackets and forming the bottom floor for the ice compartment, a conducting frame removably supported on the metal plate, positioned by the insulating frame within the ice compartment.

JEFFERSON ERVIN FOLTZ.